(12) United States Patent
Houle et al.

(10) Patent No.: US 8,493,968 B2
(45) Date of Patent: Jul. 23, 2013

(54) VOICE-OVER-INTERNET PROTOCOL DEVICE LOAD PROFILING

(75) Inventors: Dennis J Houle, Plano, TX (US); Rachel Scarbrough, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1117 days.

(21) Appl. No.: 12/334,356

(22) Filed: Dec. 12, 2008

(65) Prior Publication Data

US 2010/0150136 A1    Jun. 17, 2010

(51) Int. Cl.
*H04L 12/66* (2006.01)
*G06F 15/173* (2006.01)
*G06F 9/44* (2006.01)

(52) U.S. Cl.
USPC ........... 370/352; 709/223; 709/224; 717/168; 717/171

(58) Field of Classification Search
USPC ................ 370/352; 717/168–173; 709/223
See application file for complete search history.

(56) References Cited

U.S. PATENT DOCUMENTS

| | | | | |
|---|---|---|---|---|
| 5,954,797 | A * | 9/1999 | Sidey | 709/223 |
| 7,080,371 | B1 * | 7/2006 | Arnaiz et al. | 717/170 |
| 7,907,531 | B2 * | 3/2011 | Jha et al. | 370/241 |
| 2005/0055687 | A1 | 3/2005 | Mayer | |
| 2006/0200856 | A1 * | 9/2006 | Salowey et al. | 726/5 |
| 2006/0217111 | A1 | 9/2006 | Marolia et al. | |
| 2006/0236083 | A1 * | 10/2006 | Fritsch et al. | 713/1 |
| 2007/0094691 | A1 | 4/2007 | Gazdzinski | |
| 2007/0127452 | A1 * | 6/2007 | Croy | 370/356 |
| 2008/0163192 | A1 | 7/2008 | Jha et al. | |
| 2008/0163372 | A1 | 7/2008 | Wang | |
| 2008/0240401 | A1 | 10/2008 | Mergen et al. | |
| 2009/0003533 | A1 * | 1/2009 | Appiah et al. | 379/1.01 |

* cited by examiner

*Primary Examiner* — Duc Nguyen
*Assistant Examiner* — Sonia Gay

(57) ABSTRACT

A device may obtain, from a remote device on a network, information regarding loads and Session Initiation Protocol (SIP) devices on which the loads are installed. In addition, the device may access a database storing load compatibility information, identify problematic loads based on the obtained information and the load compatibility information, determine fixes for one or more of the problematic loads, and apply the fixes to the one or more of the problematic loads over the network.

19 Claims, 6 Drawing Sheets

VOICE-OVER-INTERNET PROTOCOL DEVICE LOAD PROFILING

BACKGROUND INFORMATION

Some Voice-over-Internet-Protocol (VoIP) devices are constructed to appear and operate similar to Plain Old Telephone System (POTS) telephones that are interconnected via Public Switched Telephone Network (PSTN). Other VoIP devices are computers with VoIP communication programs that communicate over an Internet Protocol (IP) packet based network.

DETAILED DESCRIPTION OF PREFERRED EMBODIMENTS

The following detailed description refers to the accompanying drawings. The same reference numbers in different drawings may identify the same or similar elements.

Implementations described herein relate to a system for administration (e.g., downloading, upgrading, deactivating, etc.) of different types/versions of software programs, called "loads," over a network. As used herein, the term "load" may refer to a software program that controls and directs a digital telephone or a computer-like device to function and operate as a Voice-over-Internet-Protocol (VoIP) or Internet Protocol (IP) telephone. In addition, as used herein, the term "Session Initiation Protocol" (SIP) may refer to a signaling protocol for initiating, conducting, and/or terminating a communication session between entities (e.g., software applications) over an Internet Protocol (IP) network, as specified by Internet Engineering Task Force (IETF) Request for Comments (RFC) 3261.

Within a network, different devices may require different loads to be installed in their memories to allow the devices to operate as IP/VoIP telephones. However, in some instances, users and/or operators may have installed loads that are incompatible with and/or harmful to host devices, the network, and/or other devices in the network. To prevent or eliminate such events for a large number of IP/VoIP telephones, a centralized, load profiling system may track and administer different types of loads at the IP/VoIP telephones.

Figure 1:
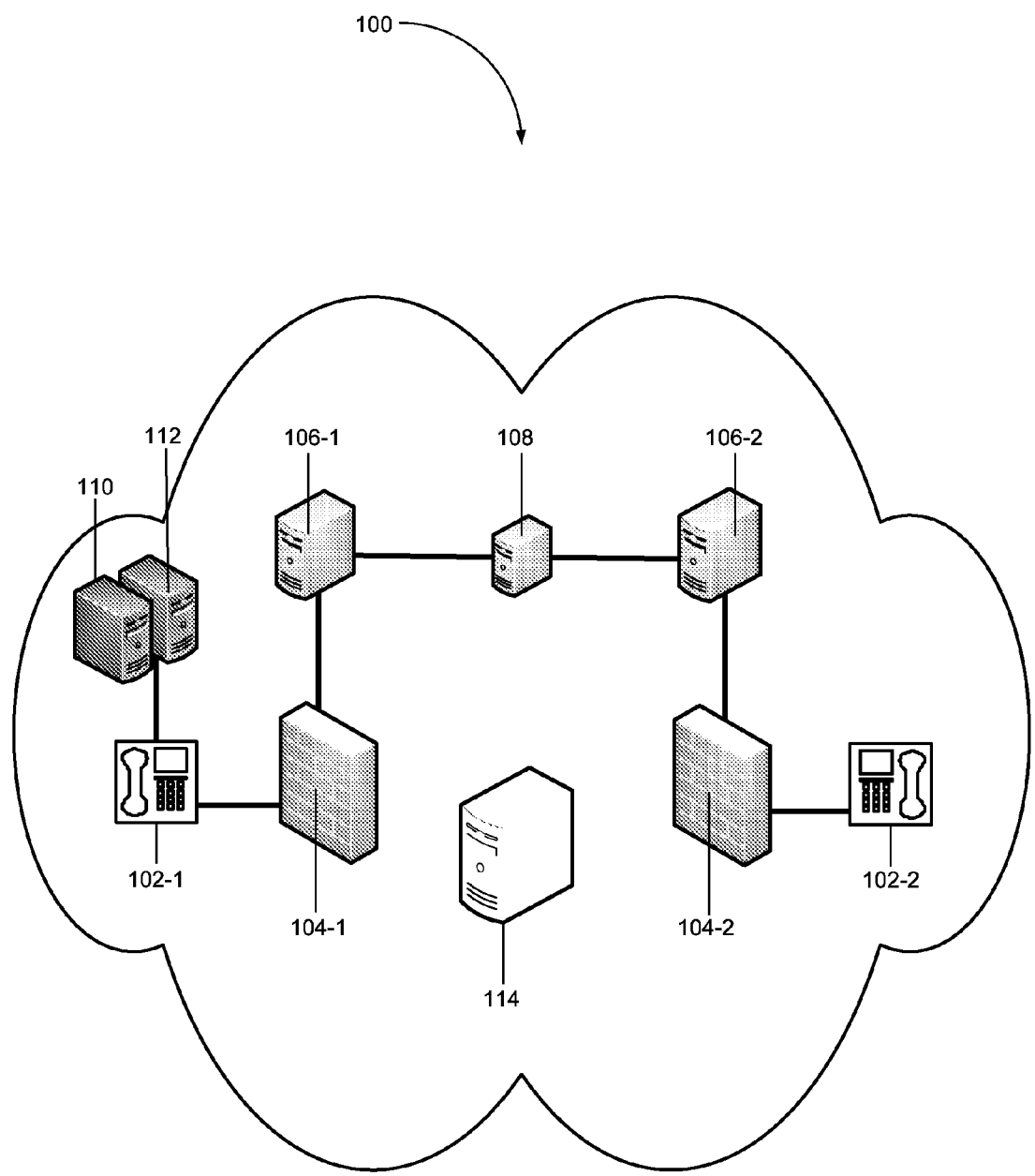
FIG. 1 shows an exemplary network in which concepts described herein may be implemented.

FIG. 1 shows an exemplary network in which concepts described herein may be implemented. Typically, network 100 may include one or more wired and/or wireless networks that are capable of exchanging information, such as voice, video, documents, multimedia, text, etc. For example, network 100 may include one or more public switched telephone networks (PSTNs) or another type of switched network. Network 100 may also include one or more wireless networks and may include a number of transmission towers for receiving wireless signals and forwarding the wireless signals toward the intended destination. Network 100 may further include one or more packet switched networks, such as an IP based network, a local area network (LAN), a wide area network (WAN), a personal area network (PAN), an intranet, the Internet, or another type of network that is capable of exchanging information.

As shown in FIG. 1, network 100 may include client devices 102-1 and 102-2 (herein collectively referred to as client devices 102 and individually as client device 102-x), router/firewall devices 104-1 and 104-2 (herein collectively referred to as router/firewall devices 104 and individually as router/firewall device 104), session border controller (SBC) devices 106-1 and 106-2 (herein collectively referred to as SBC devices 106 and individually as SBC device 106-x), a proxy server device 108, a registration device 110, a location server device 112, and a load profiling device 114.

In FIG. 1, because network 100 is illustrated partly to convey clarity in description, network 100 does not show other network components, such as switches, bridges, etc. or all interconnections (e.g., connections between load profiling device 114 and other devices). In addition, depending on the implementation, network 100 may include fewer, additional, or different devices than those illustrated in FIG. 1. For example, in one implementation, network 100 may include additional SBC devices, proxy server devices, registration devices, location servers, a redirect server (not shown), etc. In another example, the functionalities of both registration device 110 and location server device 112 may be combined in a single device.

Client device 102-x may include a load that controls and directs client device 102-x to function and/or operate as an IP/VoIP telephone. Client device 102-x may include a device specifically designed to operate exclusively as a VoIP/IP telephone (e.g., a Cisco IP phones, Polycom IP phones, etc.) and/or any of the following devices that have the ability to or are adapted to operate as an VoIP/IP telephone, such as, for example, a mobile telephone with an VoIP/IP communication capability, a personal digital assistant (PDA) or electronic notepad with an VoIP/IP software application, a networked laptop computer or personal computer (PC), a VoIP/IP Integrated Access Device (IAD) (e.g., Mediatrix VoIP IAD) that allows a POTS telephone plugged into the VoIP/IP IAD to communicate over a packet switched network in accordance with the SIP, etc.

Router/firewall device 104-x may include mechanisms for routing packets, modifying network addresses of packets (e.g., network address translation (NAT)), and for protecting devices in network 100 against unauthorized egress/ingress. For example, router/firewall device 104-1 may direct packets from client device 102-1 toward SBC device 106-x.

SBC device 106-x may provide for signaling as well as a set up, maintenance, and/or tear down of media channels, such as VoIP sessions, video streams, instant messaging sessions, etc. In performing these functions, SBC device 106-x may modify portions of SIP packets, such as SIP packet headers.

Proxy server device 108 may include an entity (e.g., a device, an application, etc.) that operates on behalf of another entity, such as client device 102-x. In acting on behalf of another, proxy server device 108 may route VoIP/IP signaling messages toward their destinations. In some implementations, proxy server device 108 may rewrite contents of VoIP/IP signaling messages.

Registration device 110 may include a device for registering a user and storing the registration information at location server device 112. The registration may include receiving binding information (e.g., an association) between an address of record (AOR) (e.g., a uniform resource identifier (URI)) and a network address (e.g., an IP address) and store the binding information at location server device 112. In addition, the registration may include receiving information about client devices 102 and loads installed thereon. To initiate the registration, client device 102-x may issue a SIP REGISTER command along with the binding information and/or the client device/load information to registration device 110.

Location server device 112 may include a device at which registration device 110 stores the bindings and the client device/load information. Other devices in network 100, such as proxy server device 108, load profiling device 114, etc., may obtain the binding information, client device information, and/or information about loads on client devices 102 from location server device 112. For instance, proxy server device 108 may obtain an IP address of client device 102-1 from location server device 112, in order to initiate a communication session between SIP applications on client devices 102-1 and 102-2. In another example, load profiling device 114 may obtain a specific version of load that is installed on client device 102-2 from location server device 112.

Load profiling device 114 may include components to track and/or administer different types of loads on/to client devices 102. To track installations of loads and/or administer the loads, load profiling device 114 may access client devices 102, router/firewall devices 104, proxy server device 108, registration device 110, and/or location server device 112, as described further below.

For example, assume that load profiling device 114 determines that loads on client devices 102 may transmit packets that can eventually cause another device in network 100 to crash. In such an instance, load profiling device 114 may provide a list of IP address of client devices 102-x to router/firewall devices 104, SBC devices 106, and/or proxy server device 108. In response, router/firewall devices 104, SBC devices 106, and/or proxy server device 108 may block packets that originate from or are destined toward client devices 102. In a different implementation, load profiling device 114 may deactivate a particular client device 102-x by locking a user account at location server device 112.

Figure 2:
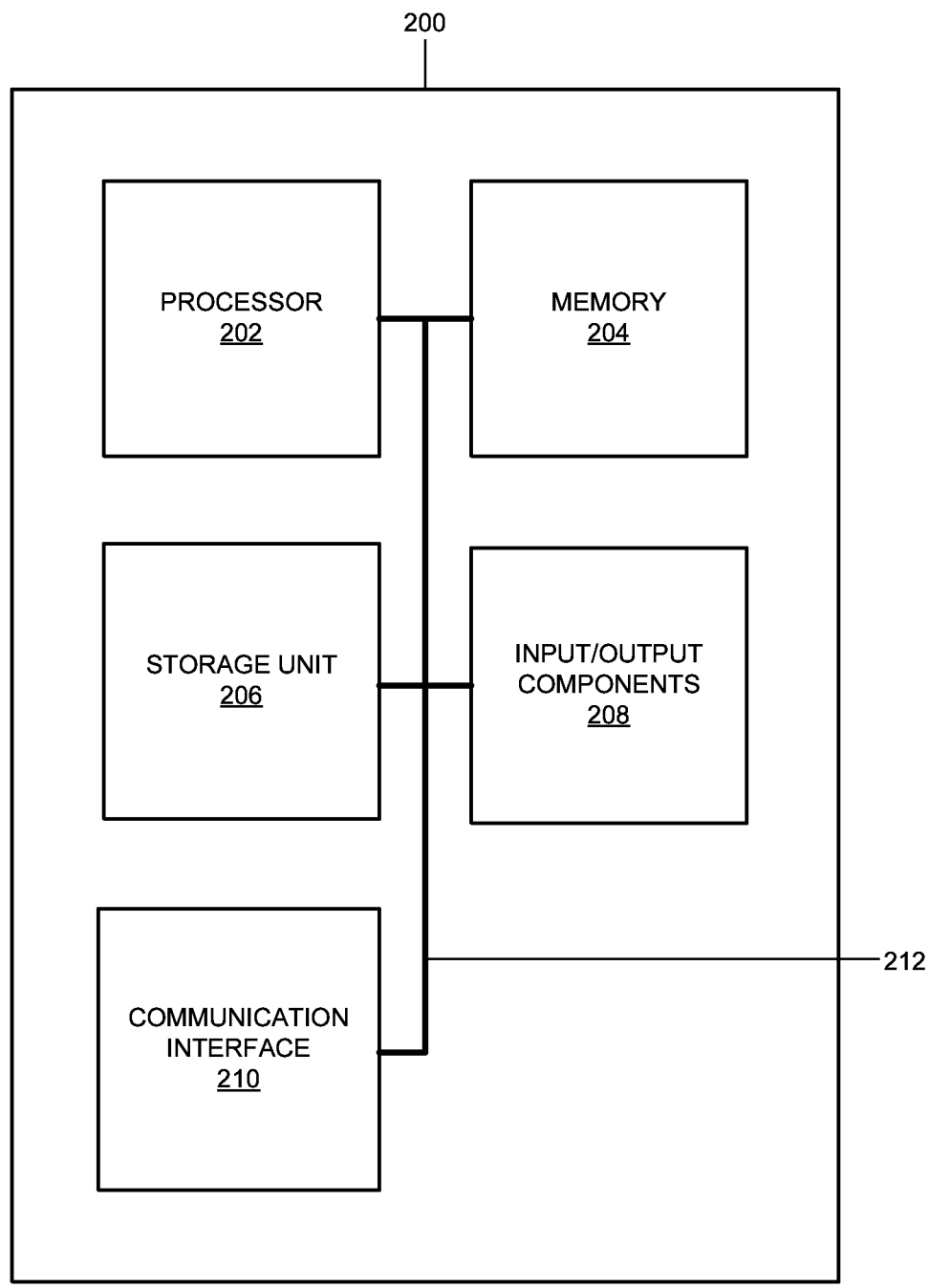
FIG. 2 is a block diagram of exemplary components of a network device of FIG. 1.

FIG. 2 is a block diagram of exemplary components of a network device 200. Network device 200 may represent any of devices 102 through 114 in FIG. 1. As shown, network device 200 may include a processor 202, memory 204, storage unit 206, input/output components 208, communication interface 210, and bus 212.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM), or onboard cache, for storing data and machine-readable instructions. Storage unit 206 may include a magnetic and/or optical storage/recording medium. In some implementations, storage unit 206 may be mounted (e.g., UNIX mount) under a directory tree or mapped to a drive.

Input/output components 208 may include a display (e.g., a cathode ray tube, a liquid crystal display (LCD), an organic light emitting diode (OLED) display, etc.), a keyboard, a mouse, a speaker, a microphone, a Digital Video Disk (DVD) writer, a DVD reader, Universal Serial Bus (USB) ports, and/or other types of components for converting physical events or phenomena to and/or from digital signals that pertain to network device 200.

Communication interface 210 may include any transceiver-like mechanism that enables network device 200 to communicate with other devices and/or systems. For example, communication interface 210 may include mechanisms for communicating via a network, such as a wireless network. In these implementations, communication interface 210 may include one or more radio frequency (RF) transmitters, receivers and/or transceivers and one or more antennas for transmitting and receiving RF data. For example, communication interface 210 may include a radio or television tuner, a mobile telephone transceiver, etc. Communication interface 210 may also include a modem or an Ethernet interface to a LAN or other network for communicating with other devices. Bus 212 may provide an interface through which components of network device 200 may communicate with one another.

In FIG. 2, network device 200 is illustrated as including components 202-212 partly for clarity in description. In an actual implementation, network device 200 may include additional, fewer, or different components. For example, network device 200 may include one or more power supplies, fans, motherboards, video cards, etc.

Figure 3A:
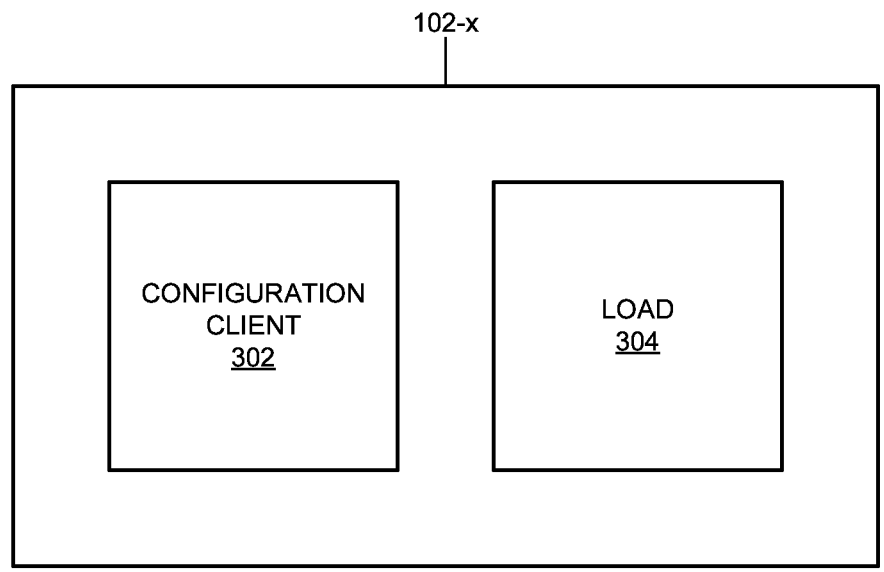
FIG. 3A is a block diagram illustrating functional components of a client device of FIG. 1 according to an exemplary implementation.

FIG. 3A is a block diagram of functional components of client device 102-x according to an exemplary implementation. As shown, client device 102-x may include a configuration client 302 and a load 304. Depending on the implementation, client device 102-x may include additional, fewer, or different components than those illustrated in FIG. 3A (e.g., an operating system (e.g., Windows, UNIX, etc.), an application (e.g., an email client program, an instant messaging program, etc.), etc.). In a different implementation, the functionalities of configuration client 302 and load 304 may be integrated in one or more components.

Configuration client 302 may include a component for configuring client device 102-x upon boot up and for periodically sending registration information and/or descriptions of client device 102-x and load 304 to registration device 110. For example, upon booting, configuration client 302 may contact load profiling device 114 to download and install an upgrade to load 304. In another example, configuration client 302 may periodically send binding information and information that describes load 304 (e.g., a name of load 304, a version number, etc.) and/or client device 102-x (e.g., IP address) to registration device 110.

In some implementations, configuration client 302 may include a soft switch that can be triggered, with or without user permission, from a remote device (e.g., load profiling device 114). Triggering the soft switch may cause client device 102-x to reboot, and cause configuration client 302 to re-register at registration device 110. In other implementations, configuration client 302 may be capable of receiving a request from a remote device to upgrade, downgrade (e.g., revert to earlier version), and/or modify load 304.

In one implementation, configuration client 302 may cause load 304 to send a SIP REGISTER command, binding information, and/or descriptions of client device 102-x and load 304 (e.g., the name of load 304 and its version number, client device 102-x's model number, etc.) to registration device 110. In response, registration device 110 may register client device 102-x/load 304 and store the binding information at location server device 112. The descriptions of client device 102-x and/or load 304 may be stored at registration device 110 and/or location server device 112.

Load 304 may include a software program that controls and directs client device 102-x to function and operate as a VoIP/

IP telephone. Load 304 may provide for authentication, a user interface (e.g., methods for inputting alphanumeric characters from a keypad), a VoIP interface (e.g., interface for initiating a communication based on SIP, receiving user preferences that are associated with an IP telephone (e.g., a greeting), etc.), error reporting, etc. Load 304 may be hosted in different types of client devices 102-x (e.g., an IAD, a personal computer, etc.).

Figure 3B:
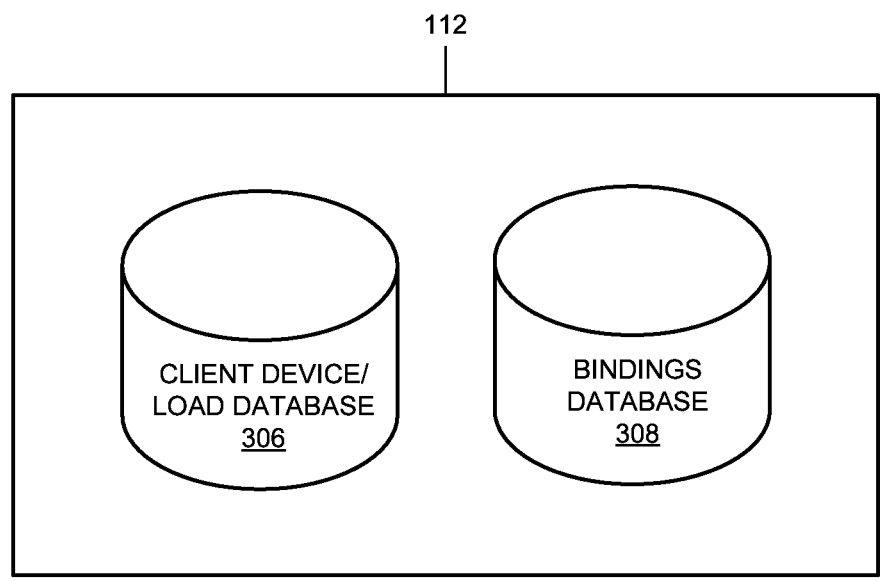
FIG. 3B is a block diagram illustrating functional components of a location server device of FIG. 1 according to an exemplary implementation.

FIG. 3B is a block diagram illustrating functional components of location server device 112 according to an exemplary implementation. As shown, location server device 112 may include a client device/load database 306 and bindings database 308. Depending on the implementation, location server device 112 may include additional, fewer, or different components than those illustrated in FIG. 3B (e.g., an operating system, an application (e.g., a web server), etc.).

Client device/load database 306 may include information about client devices 102 and load 304. For example, for each client device 102-x, client device/load database 306 may include a Media Access Control (MAC) address of client device 102-x, a device model of client device 102-x, a name/version of load 304 in client device 102-x, the time at which load 304 was installed at client device 102-x, etc.

Bindings database 308 may include a list of bindings. Each binding may include information that associates an IP address with an AOR of client device 102-x and/or load 304. In some instances, where client device 102-x or load 304 includes multiple VoIP/IP lines, an IP address may be associated with each line.

Figure 4:
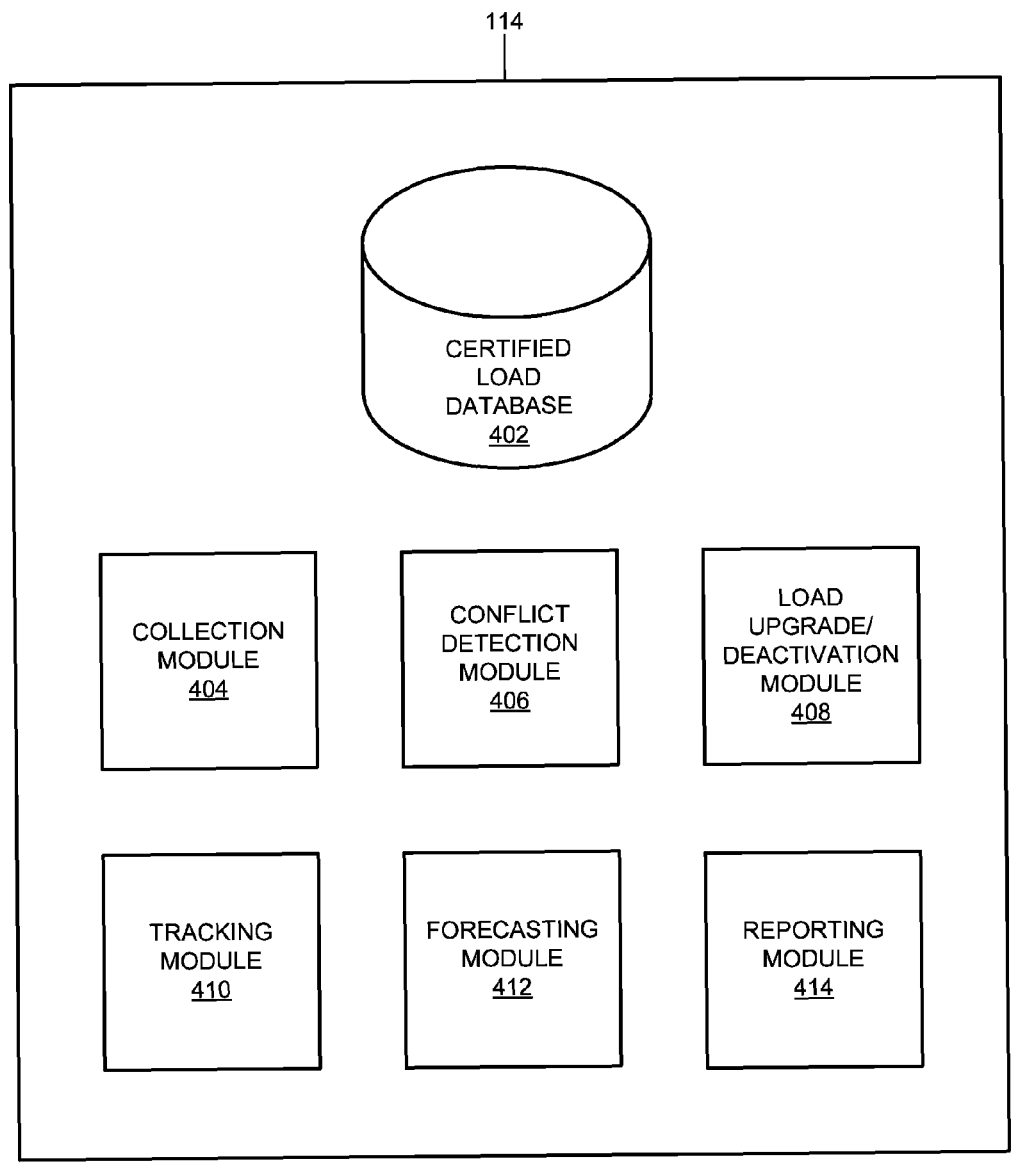
FIG. 4 is a block diagram illustrating functional components of a load profiling device of FIG. 1 according to an exemplary implementation.

FIG. 4 is a block diagram illustrating functional components of load profiling device 114 according to an exemplary implementation. As shown, load profiling device 114 may include a certified load database 402, collection module 404, conflict detection module 406, load upgrade/deactivation module (LUM) 408, tracking module 410, forecasting module 412, and reporting module 414. Depending on the implementation, load profiling device 114 may include additional, fewer, or different functional components than those illustrated in FIG. 4. Further, the functionalities of components 402-414 may be implemented in fewer or more components.

Certified load database 402 may include a list of loads that are certified as being compatible with specific client device 102-x models/types, devices in network 102-x, and/or other loads. In some implementations, certified load database 402 may identify loads that have security issues, loads that have been only beta-tested, and/or loads which can produce packets that crash or bring down another device in network 100. In addition, certified load database 402 may include copies of loads that have been certified. These copies may be used to upgrade, downgrade, and/or modify loads on client devices 102.

Collection module 404 may include a component for collecting information about client devices 102 from SBC devices 106, proxy server device 108, and/or location server device 112. For example, collection module 402 may obtain logs of client device 102-1's communication sessions from SBC devices 106 and/or proxy server device 108. In another example, collection module 402 may download client device/load database 306 and/or bindings database 308 from location server device 112.

Conflict detection module 406 may include a component for determining whether load 304 installed on client device 102-x is certified as being compatible or interoperable with client device 102-x. In determining the compatibility/interoperability, conflict detection module 406 may use information obtained by collection module 404 and compare the information to information stored in certified load database 402. For example, conflict detection module 406 may perform a lookup in certified load database 402 based on the name of load 304 on client device 102-1, and obtain a list of device models/types on which load 304 may execute. If the model/type of client device 102-1 is not in the list, conflict detection module 406 may signal or output a notification that load 304 on client device 102-1 is not certified for client device 102-1.

In another example, conflict detection module 406 may determine whether load 304 may crash and/or harm other devices in network 100. As in the previous example, conflict detection module 406 may perform a lookup in certified load database 402 to determine whether a particular load 304/client device 102-x combination may be interoperable or harmful (e.g., causes another load 304 on a particular client device 102-x type to crash) to another load 304/client device 102-x combination in network 100. In yet another example, conflict detection module 406 may determine whether load 304 has a security hole via which a device external to network 100 can gain unauthorized access to network 100.

As used herein, the term "problematic load" may refer to a load 304 that is installed on client device 102-x, is incompatible or uncertified with respect to client device 102-x, is not interoperable with other load 304/client device 102-x combinations in network 100, is harmful to other devices in network 100, and/or presents a potential security compromise. In one implementation, based on identified problematic loads 304, conflict detection module 406 may determine a list of users/customers that are associated with problematic loads 304, and provide the list to appropriate parties (e.g., VoIP/IP telephone administrators in network 100).

LUM 408 may include a component to upgrade, downgrade, modify, deactivate, and/or apply a patch to load 304 that has been determined as problematic. As used herein, the term "fixing a load" may refer to upgrading, modifying, downgrading, deactivating, and/or applying a patch to load 304.

In one implementation, to fix load 304, LUM 408 may notify and/or instruct a user of client device 102-x to fix load 304. The instruction may include a Universal Resource Locator (URL) of a site from which one can download an upgrade, downgrade, or patch. If the user does not comply with the instruction, provided that LUM 408 has the authority to fix client device 102-x without the user's consent, LUM 408 may fix load 304 itself, by interacting with configuration client 302 and/or load 304 on client device 102-x. In the preceding, LUM 408 may determine whether the user has complied with the instructions by obtaining the latest registration information from location server device 112 and comparing the information to the instruction/notification.

In a different implementation, LUM 408 may countdown (e.g., from three) the number of times or the amount of time for/in which the user may communicate with others via load 304 on client device 102-x. At certain intervals in the countdown, LUM 408 may issue a warning to the user that load 304 will be disabled after the countdown completes. If the countdown reaches zero, LUM 408 may fix load 304 with or without user permission. In the preceding, LUM 408 may obtain the number of times the user has communicated with another device or the elapsed time since the issuance of a first warning, based on SIP logs in proxy server device 108. The SIP logs may include entries describing SIP communications sessions of different client devices 102. The entries for particular client device 102-x may be searched in the SIP logs based on the IP address of client device 102-x.

After the countdown, LUM 408 may prevent client device 102-x from communicating with other devices by, for example, locking a user account associated with client device 102-x. In a different implementation, LUM 408 may send a list of IP addresses that are associated with client device 102-x to router/firewall devices 104, SBC devices 106, and/or proxy server device 108. In this implementation, router/firewall device 104, SBC devices 106, and/or proxy server device 108 may prevent packets that originate from or are destined to client device 102-x from passing through one or more of devices 104-108.

In some instances, where particular load 304 does not pose a significant potential problem, LUM 408 may simply issue a warning to a user of client device 102-x. In other instances, LUM 408 may send a notification that starts an interactive session between LUM 408 and the user. The interactive session may offer the user an option to fix problematic load 304 and guide the user through a series of steps by which load 304 on client device 102-x may be fixed.

In performing various functions, LUM 408 may account for complying with regulations, such as Federal Communications Commission's Rules on 911 service. For example, LUM 408 may ensure that an upgrade permits 911 calls to be routed properly. As explained above, in one implementation, LUM 408 may prevent client device 102-x from communicating with other devices by providing SBC devices 106, proxy server device 108, and/or router/firewall devices 104 with the IP address of client device 102-x. In such an implementation, SBC devices 106, proxy server device 108, and/or router/firewall devices 104 may still allow packets that correspond to 911 calls to be routed to their destinations.

Tracking module 410 may store outputs of collection module 404 and conflict detection module 406, obtain snapshots of different types of client devices 102 and loads 304 in network 100, and perform a trending analysis based on the snapshots. For example, based on the information from collection module 404 and conflict detection module 406, tracking module 410 may obtain a network snapshot describing 100 copies of load X and 200 copies of load Y installed on client devices.

In the example, assume that notices are sent to users of client devices 102 from load profiling device 114, requesting the users to upgrade loads on client devices 102. After a week, tracking module 410 may obtain another snapshot, which shows 200 copies of load X and 100 copies of load Y. Based on the snapshots, tracking module 410 may output the number of copies of load X and/or load Y as a function of time.

Tracking module 410 may perform the trending analysis for different loads, models/types of client devices, etc., including soft VoIP/IP telephones (e.g., a VoIP/IP telephone application installed on a PC, laptop, etc.) or specialized devices (e.g., Polycom VoIP/IP telephones, Cisco VoIP/IP telephones, etc.) running embedded systems (e.g., Windows CE).

Forecasting module 412 may include components to help VoIP/IP telephone administrators plan for installation of VoIP/IP telephones and loads, upgrades of the loads, deactivation of defective or buggy loads, etc. For example, based on the number of loads that need to be upgraded and an estimate of how much time each upgrade requires (e.g., based on average bandwidth of network 100), forecasting module 412 may determine how long it may take to upgrade a particular type of loads in network 100. Based on the estimate, VoIP/IP telephone administrators may schedule automatic upgrades to occur at particular times and days.

In another example, forecasting module 412 may list different load 304/client device 102-x combinations that are to be fixed (e.g., upgraded/downgraded or patched), and prioritize the fixes for the combinations. For example, if a specific load 304/client device 102-x combination is most likely to fail, such combination may be fixed first. Depending on the implementation, different schemes may be used to prioritize particular load 304/client device 102-x combinations (e.g., based on criticality of known problems for a particular combination, based on the number of a specific type of load 304/client device 102-x model/type combinations, etc.).

In providing estimates of how much time network-wide fixes of load 304 may consume, forecasting module 412 may take into consideration different methods that may be used to flash (e.g., reprogram) client devices 102. For example, if users of client devices 102 are to be notified with a countdown, upgrading loads on all client devices 102 in network 100 may expend a significant amount of time. In contrast, upgrading or downgrading loads 304 without user consent may be performed in less time.

Reporting module 414 may include components for obtaining outputs from tracking module 410 (e.g., snapshots of client device 102-x/load 304 count) and/or forecasting module 412 (e.g., estimates of time for fixing combinations of client device 102-x and load), formatting the outputs (e.g., in a graph, in an Excel™ spreadsheet, etc.), and distributing the formatted outputs via a web server, email messages, etc.

In some implementations, the functionalities of load profiling device 114 may be provided to different organizations or entities as part of VoIP/IP telephone administration services. In such cases, reporting module 414 can forward/distribute the formatted outputs to the organizations or entities.

Figure 5:
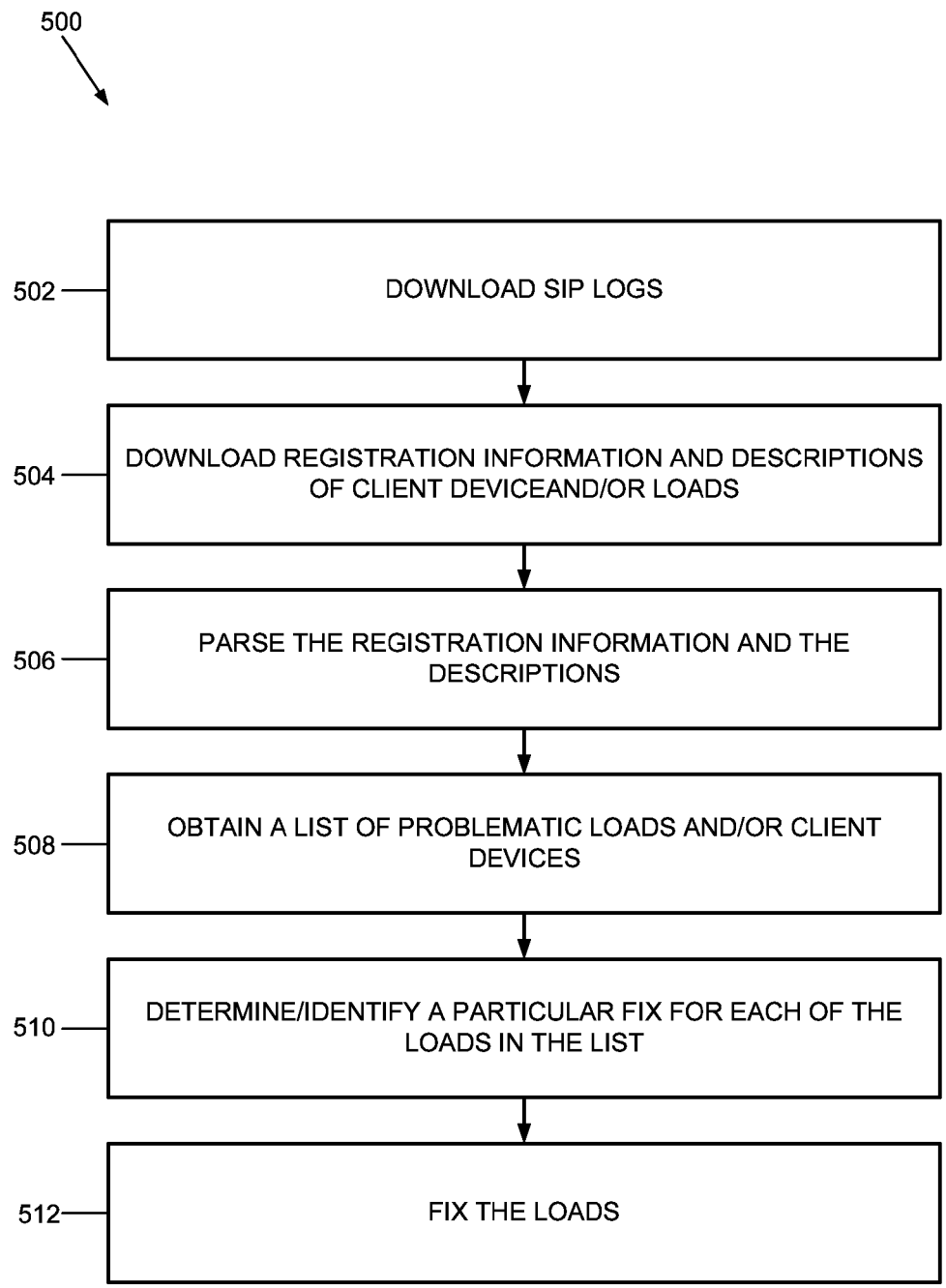
FIG. 5 is a flow diagram of an exemplary process associated with the load profiling device of FIG. 4.

FIG. 5 is a flow diagram of an exemplary process associated with load profiling device 114. Assume that client devices 102 are communicating over network 100 in accordance with SIP. Further, assume that each of client devices 102 includes load 304. Process 500 may start at 502, where load profiling device 114 may download SIP logs from SBC devices 106 and/or proxy server device 108 (block 502). The SIP logs may include records of SIP sessions between client devices 102 in network 100, and may provide information such as the time of each session, IP addresses of client devices 102 engaged in each session, etc.

Load profiling device 114 may download registration information and descriptions of client devices 102 and/or loads 304 from registration device 110 and/or location server device 112 (block 504). As discussed above, registration device 110 and/or location server device 112 may store bindings between AORs of client devices 102 and IP addresses. In addition, registration device 110 and/or location server device 112 may store descriptions of client device 102-x, such as device model/type, identifier (e.g., a name) of load 304 on client device 102-x, a version of load 304, etc. Load profiling device 114 may parse the registration information and the descriptions of client devices 102 and/or loads 304 (block 506). By parsing the registration information and the descriptions, load profiling device 114 may obtain a list of bindings, network addresses of client devices 102, a client device 102-x type, model number, etc., load 304 type, load 304 version, etc.

Load profiling device 114 may obtain a list of problematic loads and/or client devices 102 on which the problematic loads are installed (block 508). As an example, for each load 304/client device 102-x pair found at block 506, load profiling device 114 may perform a lookup in certified load database 402 to determine whether load 304 is certified. In another example, load profiling device 114 may determine whether each of loads 304 identified at block 506 poses a security issue, and/or whether the pair of load 304 and client device 102-x is interoperable with another load 304 and client device 102-x pair. The results of such determinations may be provided in the list of problematic loads 304 and/or client devices 102.

Load profiling device 114 may determine a particular fix for each of loads 304 in the list (block 510). In one implementation, LUM 408 in load profiling device 114 may include logic for determining a specific fix that may be implemented for each load 304 and client device 102-*x* pair. For example, if load 304 is a Star SIP 2000 v. 2.1 and client device 102-*x* is a Delta Tech VoIP/IP Sound Point telephone, LUM 408 may decide to deactivate load 304. In another instance, LUM 408 may perform one or more of the following actions: upgrade load 304, notify a user about load 304, issue a countdown to the user regarding the problematic load, downgrade load 304 (e.g., current load 304 is not certified), send a patch to the load 304, automatically apply the patch for load 304, etc.

In some implementations, load profiling device 114 may obtain information that is needed to apply a specific fix from the SIP logs downloaded at block 502. For example, load profiling device 114 may determine that router/firewall device 104-1 is to block packets from client device 102-1 after three SIP sessions. Based on the SIP logs, load profiling device 114 may count the number of SIP sessions in which client device 102-1 participated after the issuance of the countdown notification to client device 102-1. If the count is greater than three, load profiling device 114 may instruct router/firewall device 104-1 to prevent packets from being routed from client device 102-1 to another device.

At block 512, load profiling device 114 may apply the fix to load 304 (block 512).

Figure 6:
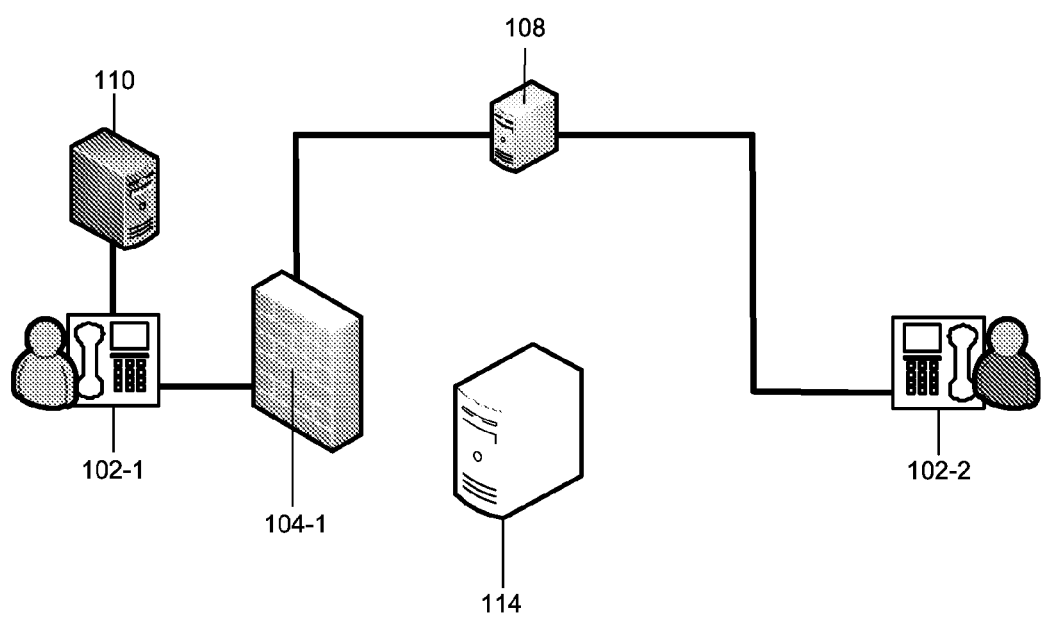
FIG. 6 illustrates an exemplary process associated with the load profiling device of FIG. 4.

The following example, in conjunction with FIG. 6, illustrates processes associated with load profiling device 114 in accordance with implementations described above. Assume that devices 102-114 are arranged as illustrated in FIG. 6, and that load profiling device 114 can access and interact with firewall 104-1, proxy server 108, and registration device 110. In addition, assume that client devices 102-1 and 102-2 are Delta Tech Precision Sound 2400 and IAD Ultimate 910 devices, respectively, and that loads on client devices 102-1 and 102-2 are Sound Mate 2.0 and Universal IAD IP Phone 1.1, respectively. Further, assume that a binding at client device 102-1 associates christy@banana.com with IP address 10.1.3.4, and a binding at client device 102-1 associates doug@neverland.com with IP address 10.2.1.3. Still further, assume client device 102-1 registers with registration device 110 every 60 minutes, and that client device 102-1 conveys its binding information and the descriptions of client device 102-1 (i.e., "Delta Tech Precision Sound 2400"), and the name/version of load 304 (i.e., "Sound Mate 2.0") to registration device 110.

In the example, load profiling device 114 downloads the registration information and the descriptions of client device 102-1 and load 304 (i.e., the IP address 10.1.3.4, christy@banana.com, "Delta Tech Precision Sound 2400," and "Sound Mate 2.0") from registration device 110. Load profiling device 114 parses the registration information and the descriptions, and identifies "Delta Tech Precision Sound 2400" and "Sound Mate 2.0" as the names of client device 102-1 and load 304, respectively.

Assume that Sound Mate 2.0 is identified in certified load database 402 in load profiling device 114 as problematic for Delta Tech Precision Sound 2400 VoIP/IP telephones, and that downgrading from Sound Mate 2.0 to Sound Mate 1.0 on Delta Tech Precision Sound 2400 VoIP/IP telephones allows Delta Tech Precision Sound 2400 VoIP/IP telephones to operate correctly.

Load profiling device 114 performs a lookup of Sound Mate 2.0 in certified load database 402 and determines that Delta Tech Precision Sound 2400 is incompatible with Sound Mate 2.0. Further, load profiling device 114 identifies Sound Mate 1.0 as a load that is compatible with Delta Tech Precision Sound 2400. However, because load profiling device 114 does not have access to Sound Mate 1.0, load profiling device 114 determines that a best temporary fix for client device 102-1 is to prevent client device 102-1 from communicating with other devices in network 100.

Load profiling device 114 notifies client device 102-1 that client device 102-1 will not be allowed to communicate with other devices until problems with Sound Mate 2.0 on client device 102-1 can be resolved, and sends a message to router/firewall device 104-1 to prevent SIP packets from client device 102-1 from being routed to other devices in network 100.

In the above, a system for administering (e.g., downloading, upgrading, downgrading, modifying, deactivating, patching, etc.) loads is described. To eliminate problematic loads in network 100, which may include a large number of IP/VoIP telephones, load profiling device 114 may track and administer different types of loads to client devices 102 in network 100.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIG. 5, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the above, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device-implemented method comprising:
obtaining, from a remote device on a network, profile information identifying pairings of loads and Session Initiation Protocol (SIP) devices on the network;
accessing a database storing compatibility/interoperability information indicative of compatibility of different load-SIP device pairings and interoperability between the different load-SIP device pairings;
identifying, based on results of comparing the profile information and the compatibility/interoperability information, a potential conflict with respect to at least one of the compatibility or the interoperability of one or more of the identified load-SIP device pairings;
determining, based on the identified potential conflict, a user associated with the one or more of the identified load-SIP device pairings;
generating a notification to the user indicating an allowed number of SIP communication sessions by which the potential conflict is to be resolved by the user before a fix is to be applied;
downloading SIP logs from another remote device that logs a number of SIP communication sessions;
determining, based on the SIP logs, when the allowed number of SIP communication sessions are exhausted; and
applying, based on the exhaustion of the allowed number of SIP communication sessions, the fix to the one or more of the identified load-SIP device pairings over the network to resolve the potential conflict.

2. The method of claim 1, wherein the obtaining the profile information includes:
downloading registration information, associated with the user, from a registration server.

3. The method of claim 1, further comprising:
uploading, by one of the Session Initiation Protocol (SIP) devices, registration information associated with the user, to the remote device.

4. The method of claim 1, wherein the identifying potential conflict includes at least one of:
identifying one or more loads that have not been certified as being compatible with the respective Session Initiation Protocol (SIP) devices associated with the one or more of the identified load-SIP device pairings;
identifying loads, associated with the one or more of the identified load-SIP device pairings, that have potential security issues;
identifying loads, associated with the one or more of the identified load-SIP device pairings, which can send packets that crash devices in the network; or
identifying the one or more of the identified load-SIP device pairings that are not interoperable with the different load-SIP device pairings in the network.

5. The method of claim 1, further comprising:
estimating an amount of time needed to apply the fix to resolve the potential conflict.

6. The method of claim 1, further comprising at least one of:
determining whether a load, associated with the one or more of the identified load-SIP device pairings, is to be upgraded, downgraded, or patched;
determining whether a load, associated with the one or more of the identified load-SIP device pairings, is to be prevented from communicating with other loads on the Session Initiation Protocol (SIP) devices; or
determining whether a fix is to be applied to a load, associated with the one or more of the identified load-SIP device pairings, with or without a consent of the user.

7. The method of claim 1, further comprising:
providing a countdown notification to the user based on the Session Initiation Protocol (SIP) logs.

8. The method of claim 1, wherein the applying the fixes includes:
permitting the one or more of the Session Initiation Protocol (SIP) devices with problematic loads to place 911 calls.

9. The method of claim 1, wherein the applying the fix includes:
prioritizing the fix, relative to other scheduled fixes, based on a likelihood of the potential conflict occurring.

10. The method of claim 1, further comprising:
obtaining snapshots of loads in the network;
deriving trending information from the snapshots; and
updating, based on trending information, the profile information associated with the loads.

11. The method of claim 10, further comprising:
providing reports of the trending information to users.

12. A device comprising:
a collection module to:
obtain, from a remote device on a network, a profile comprising registration information and descriptions of pairings of client devices and loads on the network;
a conflict detection module to:
compare the profile to compatibility/interoperability information indicative of compatibility of different client device-load pairings and interoperability between the different client device-load pairings,
identify, based on results of the comparison, potential conflicts with respect to at least one of the compatibility or the interoperability related to one or more of the client device-load pairings associated with the profile, and
determine users associated with the profile; and
a load fixing module to:
generate notifications to the users indicating an allowed number of communication sessions using the one or more of the client device-load pairings by which the potential conflict is to be resolved by the users,
download logs from another remote device that logs a number of the communication sessions,
determine, based on the logs, when the allowed number of communication sessions are exhausted, and
fix, based on exhaustion of the allowed number of communication sessions and with or without consent of the users, the one or more of the client device-load pairings over the network to resolve the potential conflicts.

13. The device of claim 12, wherein the client devices include at least one of a Voice-over-Internet Protocol (VoIP) telephone, a Voice-over-Internet Protocol (VoIP) Integrated Access device (IAD), a personal computer, a laptop, a personal digital assistant, or a mobile phone.

14. The device of claim 12, wherein the registration information includes:
binding information that associates an Internet Protocol (IP) address of one of the client devices with an address-of-record.

15. The device of claim 12, wherein the descriptions include at least two of:
names of client device models;
names of the loads; or
version numbers of the loads.

16. The device of claim 12, wherein the remote device includes at least one of:
  a Session Initiation Protocol (SIP) registration device; or
  a Session Initiation Protocol (SIP) location server device.

17. The device of claim 12, wherein the load fixing module is further configured to:
  prevent, based on the fix, a client device, of the one or more of the client device-load pairings, from communicating with another device over the network via Session Initiation Protocol (SIP) packets, by instructing network devices not to route the SIP packets.

18. The device of claim 17, wherein the network devices includes at least one of:
  a router, a firewall, a Session Initiation Protocol (SIP) proxy server, or a Session Border Controller (SBC).

19. A device comprising:
  means for obtaining, from a remote device on a network, a profile comprising registration information and descriptions of a pairing of a client device and a load on the network;
  means for determining that the load is problematic by comparing the profile descriptions to compatibility/interoperability information, related to compatibility of different client device-load pairings and interoperability between the different client device-load pairings, stored in a database;
  means for generating a notification, to a user associated with the client device, indicating an allowed number of communication sessions using the client device-load pairing by which the user is to perform a fix on the problematic load;
  means for downloading logs from another remote device that logs a number of the communication sessions;
  means for determining, based on the logs, when the allowed number of communication sessions are exhausted; and
  means for instructing a firewall or a network device, responsive to exhaustion of the allowed number of communication sessions, to not route packets from the client device to another device in the network when performance of the fix is not completed by the user.

* * * * *